June 3, 1941.  I. C. LOOMAN  2,244,256
APPARATUS FOR CLEARING WELLS
Original Filed Dec. 16, 1939  2 Sheets-Sheet 1
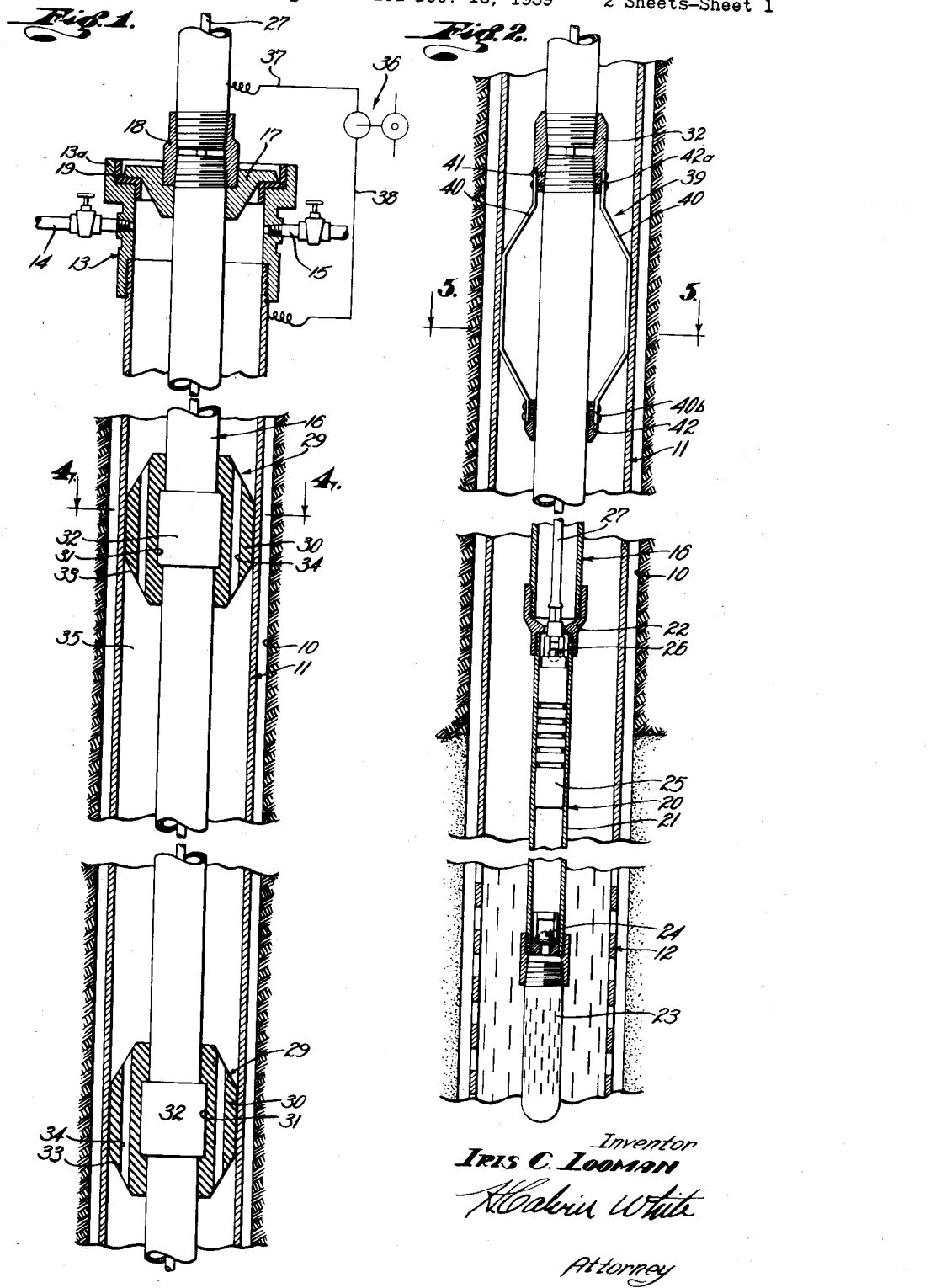
Inventor
IRIS C. LOOMAN
Attorney June 3, 1941.  I. C. LOOMAN  2,244,256
APPARATUS FOR CLEARING WELLS
Original Filed Dec. 16, 1939   2 Sheets-Sheet 2
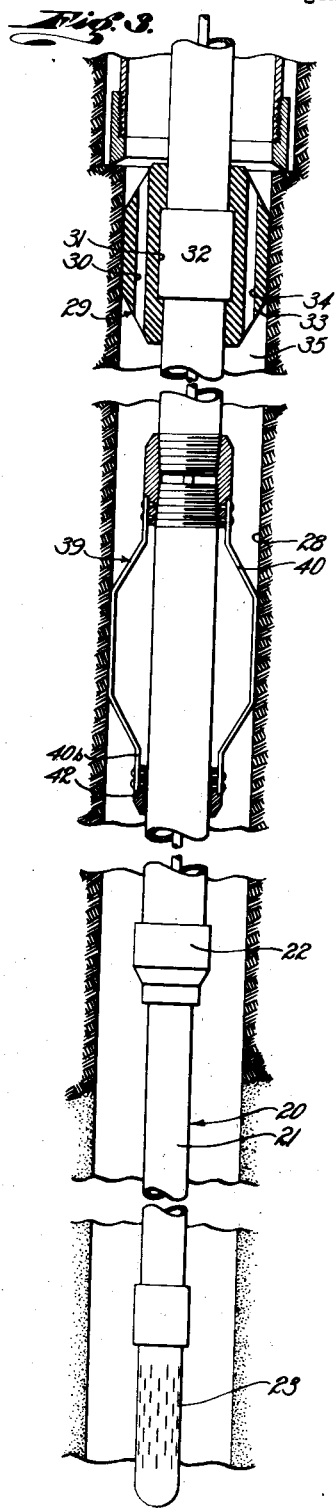
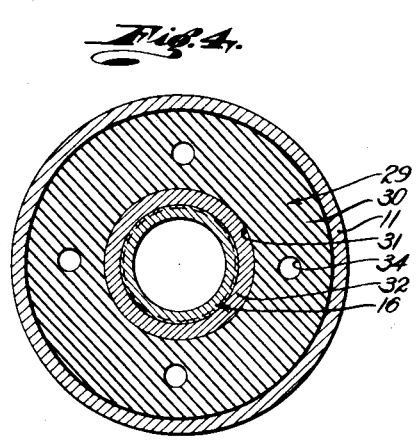
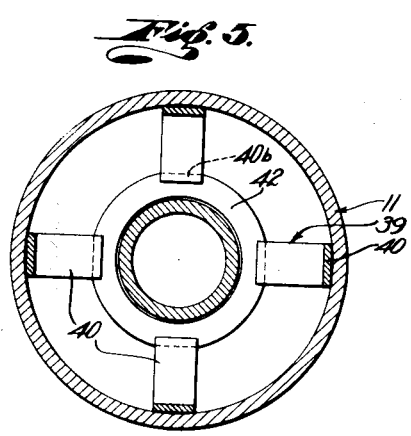
Inventor
IRIS C. LOOMAN
Attorney Patented June 3, 1941

2,244,256

UNITED STATES PATENT OFFICE 2,244,256

APPARATUS FOR CLEARING WELLS

Iris C. Looman, Borger, Tex., assignor to Electrical Treating Company, Dallas, Tex., a corporation of Texas Original application December 16, 1939, Serial No. 309,594. Divided and this application May 24, 1940, Serial No. 337,031

5 Claims. (Cl. 166—17)

This invention has to do generally with the removing of congealed paraffinic and asphaltic bodies in oil wells, and relates particularly to an improved system for electrically heating wells whereby it is made possible to effectively remove such congealed bodies at whatever location they may occur in the well. This application is a division of my copending application Ser. No. 309,594, filed December 16, 1939, on Well clearing system.

Heretofore it has been proposed to electrically heat wells interiorly, or to so heat the production fluid within the flow pipe or tubing, by the use of various specific forms of heating apparatus and for various particular purposes. In the comparatively early development of the art it was proposed to heat the fluid in the bottom of a well by an electrically energized heater suspended on a pipe or cable, and in at least one instance to supply electric current to the heater through a suspension means without the latter however being itself utilized as a heating element. These methods in which heating elements have been used are impractical and inefficient because it has been necessary to confine the heating action to a very limited space. It has not been possible to heat enough fluid so that the required temperature may be maintained as the fluid passes through the low temperature zones considerable distances above the heating element, where it is found that because of the temperature drop the substances begin to congeal. And, further, such devices are unsuited to my purposes in that all of the heat concentration is within such a short space that it is impossible to heat the fluid to maintain the desired temperatures in the normally cooler zones above, as the fluid passes upwardly through them, or to attempt to do so without over-heating the oil or causing congealed bodies to become so plastic as to have excessive adherence to the tubing at the high temperatures. To attempt to supply locally all the heat necessary to elevate the fluid temperatures in other parts of the well, above the melting or softening point of the congealed bodies, would also involve dangerously overheating the tubing itself. Another proposal has been to heat the well fluid being discharged through the tubing by an electrical conductor run down within and spaced from the tubing. Patent No. 1,646,599, issued October 25, 1927, to Schaefer, proposes to electrically heat a flow tubing that is thermally insulated exteriorly, for the purpose of heating the liquid within the tubing to cause the well to flow by expansion of the fluids. While perhaps being suitable as a means of melting or removing meltable congealed bodies in the bottom of the well or within the flow tubing, such prior systems are not adaptable, and insofar as I know have never been attempted to be used, for the purpose of removing accumulations of congealed paraffinic and asphaltic bodies from any or all the various locations where they may occur in a well, and from which these bodies must be removed if satisfactory production and operating conditions are to be maintained.

My primary object is to provide an improved and, in fact, characteristically different type of well heating system whereby it is possible to remove congealed bodies from any location or locations in which they may occur within the well or flow tubing, and to so control the heating as to be able to limit or confine the application of heat to particular or pre-determined portions of the well or tubing where heating is necessary. In accordance with the invention, heat is supplied to the well fluid by passing electrical current through a conductor run in the well and directly contacting the well fluid. This conductor ordinarily and preferably comprises simply the usual flow tubing, which is of uniform thickness and conductivity so that a given amount of specially generated or transformed electric current of high amperage and sufficient voltage may be introduced to permit a necessary pre-determined degree of heat to be maintained throughout the heated length of the tubing, and which is provided with insulators to maintain the tubing in spaced relation to the wall of the well or casing. Provision is made for heating only a portion and variable length of the tubing from a point above its lower end, by suitable means such as a conductor or adapter carried by the tubing and engaging the wall of the well, the position of the conductor being adjustable and variable longitudinally of the tubing. By positioning the conductor with proper relation to the pre-determined location of the congealed bodies to be melted in the well, the heated section of the tubing may be confined and limited to the necessary section or depth of the well that requires heating. This system, has the further advantage of permitting less than the entire length of the tubing to be heated, and therefore with a given potential of current, which is variably controlled, the degree of heat necessary is confined to that section of the tubing through which the current is passed and eliminates the possibility of intense or excessive heating.

The invention is also distinguished from prior well heating systems in that it is operable in conjunction with any known method of production and especially a well pump carried by the tubing. As will appear later, the pump serves a purpose in addition to its usual function, of providing valve means for retaining pressure in the well, and alternately, it also enables production to be maintained, if desired, while the well is being heated, due to the fact that the entire length of the tubing above the adapter may be heated and uniform heating of the traveling fluid maintained until the fluid is exhausted at the surface.

The advantages of the invention will perhaps be better appreciated by referring briefly to illustrative conditions that have been encountered in actual operations, and the manner in which the present system has operated to improve them. For example, the Texas Panhandle has many wells in which the formation of paraffine is considered to be one of the major production problems. In these wells the last string of casing may be set at a point approximating 2700 feet and then the well is drilled to a total depth ranging upwards from 180 feet below the casing. The tubing string is run to a point within say 5 feet of the bottom of the hole, and thus to a depth considerably below the casing. Fluid levels are usually at varying points up to 1500 feet. In most cases, the bottom hole temperatures are sufficient to keep the paraffine in solution, but as the fluid is being pumped through the tubing, it passes through locations in the well at which the temperatures are considerably lower than bottom hole temperature. These colder zones may be below the usual fluid level or they may be above it. The fluid shows definite heat losses as it is pumped through these points of low temperature, and further heat losses are caused by the expansion of gases carried by the fluid at elevations of reduced pressures, so that the temperature of the fluid drops below that of the bottom hole temperature and paraffine begins to congeal in the tubing. Also it is often found that the fluid level in the well may extend up into the cooler zones so that the fluid toward the top may be considerably lower in temperature than that at the bottom of the hole. In such cases, when the well is started pumping and the fluid level is lowered, paraffine will collect on the outside of the tubing from the fluid level down to that point at which the fluid again becomes warm enough to keep the paraffine in solution. Under such conditions it is necessary to be able to place the conductor at any point either above or below the fluid level, and either within the casing string, or below it, in order to meet all the requirements.

It is also found that when some wells are pumped from time to time and their normal fluid levels are depressed, the expansion of gases liberated and escaping from the formation will lower the temperature of the remaining fluid in the well and cause a settling out of paraffine in the formation. By properly setting the conductor above the bottom of the tubing string it is possible to heat the remaining fluids in the hole to a temperature sufficient to re-dissolve the congealed material, and thereby clean the surface of the formation and allow the paraffine to be removed from the well bore by the method of production being used.

The present system may be used to advantage not only for the removal of paraffine but also for purposes of restoring production in wells that have ceased to flow. In many instances paraffine congeals in the tubing to the extent that it has been necessary to run a paraffine knife or to use chemicals. Frequently the bottom hole gas pressure is overcome by the hydrostatic pressure of an accumulated column of fluid so that the well ceases to flow and it is necessary to use a swab or compressor, or some other artificial means for causing the well to flow until it becomes live enough to produce of its own accord. These usual artificial methods require considerable time, special equipment, and are at best expensive. By installing the conductor of my system some distance below the top of the fluid level and providing a standing valve in the tubing string to permit upward flow of the fluid and gas but prevent downward flow, and then by heating the tubing and thereby generating gas from the fluid in the well, the expansion of the confined gases between the casing and tubing caused by the heat creates a downward pressure on the well liquid, giving somewhat the same effect as a compressor or swab, sufficient to cause the well to flow. At the same time I eliminate the accumulated paraffine much more cheaply and efficiently than by the usual chemical, or paraffine knife procedure.

In some Oklahoma and other fields a very bad paraffine condition is experienced both inside and outside the tubing. The outside accumulation of paraffine is caused by the lowering of the fluid in the hole, and cooling as a result of the expansion of gas liberated from the fluid. The accumulation of paraffine between the casing and tubing is in many cases so great that it becomes necessary to remove the tubing from the hole and spend weeks and even months with cable tools cleaning or removing the paraffine from the casing. By placing the adapter well in the bottom of the hole at proper depth it is easily possible to heat the tubing sufficiently to raise the temperature of the fluid in the hole to re-dissolve the congealed paraffine and permit it to be pumped, flowed, or removed from the hole by any suitable method. Ordinarily, it is unnecessary at any time to heat the tubing string above 120° F. in order to accomplish the desired result. This amount of heat is in no way detrimental to the tubing or to the fluids, but is sufficient to cause an enormous generation of gas.

All the above mentioned features and objects of the invention, as well as the details of a typical and illustrative embodiment thereof, will be understood to better advantage from the description to follow. Throughout the description reference is had to the accompanying drawings in which:

Fig. 1 is a vertical section showing the upper portion of a cased well containing the flow pipe equipped with insulators and connected with a source of electrical current;

Fig. 2 is a lower continuation of Fig. 1 showing the bottom portion of the tubing string and the adapter or conductor;

Fig. 3 is a view similar to Fig. 2 showing the tubing and adapter lowered in open hole below the casing;

Fig. 4 is an enlarged cross section on line 4—4 of Fig. 1; and

Fig. 5 is an enlarged cross section on line 5—5 of Fig. 2.

Referring first to Figs. 1 and 2 of the drawings, the well bore 10 is shown to contain the usual casing 11 carrying at its lower end a screen or perforated liner 12. The upper end of the casing carries the usual head 13 which may have any suitable number and arrangement of fluid connections shown typically as the valved lines 14 and 15. Lowered within the casing is the usual tubing string 16 which may be supported on the casing head 13 by any of the usual forms of tubing hangers, as for example the conventionally illustrated type comprising a flange 17 receiving the tubing coupling 18 and resting on an annulus 19 of suitable electrical insulating material within the upper end 13a of the casing head. The tubing 16 carries at its lower end the usual well pump generally indicated at 20 and shown typically to comprise a barrel 21 connected to the tubing by coupling 22 and having at its lower end a strainer 23 below the ball check foot valve denoted generally at 24. The pump barrel 21 contains the ordinary tubular plunger 25 carrying the downwardly seating ball check valve 26, the plunger being operated by the usual rods 27 extended upwardly through the tubing to the ground surface.

Any suitable means may be employed to maintain the tubing 16 in spaced and electrically insulated relation to the wall of the casing 11 or the wall 28 of the well bore where the tubing extends down in open hole as shown in Fig. 3. As typical means for so spacing and electrically insulating the tubing, the latter is shown to carry longitudinally spaced insulators 29 each comprising a sleeve 30 of rubber or other suitable insulating material placed about and receiving within its interior recess 31 the tubing coupling 32. The ends of the insulator sleeve may be beveled as at 33 to facilitate movement past irregularities in the well, and the sleeve is provided with suitable openings such as continuously extending, circularly spaced passages 34 to permit upward flow and escape of gases past the insulators within the space 35 between the tubing and casing or well bore.

Electrical current is supplied to the tubing 16 from any suitable source, such as a variably controlled motor generator unit or specially built and variably controlled transformer conventionally illustrated at 36 and connected by lead wire 37 with the tubing above the casing head 13, as illustrated. The opposite pole of the generator may be connected with the casing 11 through the lead wire shown at 38. The vertical extent of the electrical circuit through the tubing, and therefore the length of tubing heated by the current is determined by the location of an adapter or electrical connection generally indicated at 39, carried by the tubing and engageable with the casing or well bore, depending upon the location of the adapter. Again, any suitable means or attachment may be employed for maintaining an adjustably variable electrical connection between the tubing and the wall of the well. As typical, the adapter 39 is shown to comprise a plurality of bowed springs 40 having their upper ends 40a seated and secured within recesses 41 of coupling 32a, the lower ends 40b of the springs similarly being secured to a sleeve 42 that is slidable longitudinally on the tubing to accommodate varying expansion and contraction of the springs as they pass through different diameter portions of the well bore. Springs 40 frictionally engage the wall of the well to maintain an electrical connection from the tubing and thereby limit the upper length of the tubing being heated, in accordance with the location of the adapter.

In considering the operation of the system, it will be understood that in any given instance the adapter 40 will be applied to a particular tubing coupling and location longitudinally of the tubing, depending upon the portion or depth of the well that requires heating. Accordingly, the adapter may be located at any position on the tubing intermediate its upper and lower end and with reference to the well itself, it may be positioned at substantially the liquid level in the well, or any desired distance above or below that level, all depending upon the location of the congealed paraffinic or asphaltic bodies in the well at the outside of the tubing, as explained in the introductory discussion. It may be mentioned that in the majority of instances the adapter will be positioned a substantial distance above the lower end of the tubing or pump.

As previously observed, the heated length of the tubing may be confined to within the well casing 11, for example the upper section of the tubing shown above the adapter in Figs. 1 and 2, or the heated length of tubing may extend any desired distance within the unlined well bore 28 below the casing, as illustrated in Fig. 3. In either instance, passage of current through the tubing above the adapter heats that section of tubing and produces a direct transference of heat from the tube to the surrounding well fluid, sufficient to raise the temperature of the fluids both inside and outside the tubing to melt the congealed bodies and thus effect their removal from the zones being heated. It is to be understood that in referring to the normally congealed bodies becoming melted by heat from the tubing, it is taken into consideration that conversion of such bodies to a plastic or fluid state may be aided by the solvent properties of the well fluids at higher temperatures. Where the tubing and adapter are run in the unlined hole with the formation engaged by the adapter being used to complete the circuit as in Fig. 3, the heating may serve not only to move congealed bodies in the well, but also to free the formation of clogging bodies and thereby increase production.

It will be understood that the described heating operations may be carried on either while the well is being pumped, or when pumping has stopped, at any suitable interval and for lengths of time required for a particular job. Ordinarily, however, during the heating process pumping is stopped and flow connections from the casing head 13 are closed so that the gas contained between the tubing and casing will remain quiescent and thereby serve as an effective insulation medium against heat losses by convection. I have previously referred to the fact that heating of the well fluids in accordance with the present system may be employed to develop pressure within space 35 between the tubing and casing to facilitate downward displacement of the melted bodies to higher temperature zones and thence to the lower end of the tubing or pump for removal from the well in the production stream. Capacity for such pressure development is inherent in the system for the reason that check valve 24 serves to support within the tubing a column of fluid that may extend any distance up to the ground surface, and above the level of liquid standing in the well, the liquid column in the tubing thus providing, in effect, a hydrostatic back pressure which must be overcome by the pressure in the well before further flow into the tubing will occur.

It is important that the source of current supply have certain power characteristics for proper and most efficient heating of the tubing, and to enable the degree of heating to be maintained under control to best suit conditions existing in any given instance. Ordinary well tubing, not being of high resisting material, requires current of high amperage and low voltage in order that the necessary heat may be produced therein and the current, and therefore the resultant heating, be properly controlled. If a current with the voltage and amperage in the usual proportions were attempted to be used to produce the required heat in the tubing, it would be necessary to run the voltage so high against the fixed resistance in order to gain the required amperage, that the voltage could not be controlled or properly insulated within the tubing string. In the small spaces between the tubing and casing, high voltages would arc across and the effect would be uncontrollable. To obtain current of desirable high amperage and low voltage, I use a variably controlled generating unit or transformer, of which the designation at 36 may be taken as illustrative, capable of supplying relatively high amperage and low voltage current within the ranges required for all operating conditions. To illustrate, with the adapter set at 1500 feet on 2 inch tubing, the tubing may be heated to around 120° F. by using a current of 50 volts and 750 amperes, or 37,500 watts, for a period of 35 to 40 minutes. As will be understood, where a source of alternating current is available, a properly wound transformer may be used, instead of a generator unit, to supply current at relatively high amperage and low voltage, as indicated.

It will be understood that the drawings are to be regarded merely as typical and illustrative, and that various changes and modifications may be made without departure from the invention in its intended spirit and scope.

I claim:

1. In combination with a well casing formed of conductive material and a pipe line formed of conductive material passing through the casing and spaced therefrom, said line including a plurality of sections and coupling members connecting the sections together, spacer members carried by the pipe line and contacting interior parts of the casing, each spacer member having an internal groove of annular form receiving a coupling member and each spacer member having its intermediate part of cylindrical shape in cross section to contact the casing with its end portions of substantially conical shape and each spacer member having vertical holes therein for the passage of fluid between the casing and the pipe line, a seat forming part at the upper end of the casing, a member of non-conducting material engaging the seat forming part, a shoulder forming part on the pipe line resting on the member of non-conducting material and spring members movably connected with a lower part of the pipe line for contacting an interior part of the casing or a part of the well below the casing for electrically connecting the pipe line to the casing, means for connecting the upper part of the pipe line to a source of electrical supply and a return conductor connecting said source to the upper part of the casing.

2. In a well clearing apparatus of the character described, the combination comprising a production flow tubing lowered within the well in spaced relation to the wall thereof and in direct and open exposure to surrounding well fluid, conductor means deep in the well and substantially above the lower end of the tubing electrically connecting the tubing and the wall of the well, means for supplying to a length of the tubing extending continuously upward from said conductor means to substantially the top of the tubing electric current of sufficient amperage to heat said length of the tubing to a temperature sufficient to melt congealed fluid contacting the heated tubing, said conductor means serving to determine the vertical extent of the tubing heated to said melting temperature.

3. In a well clearing apparatus of the character described, the combination comprising a production flow tubing lowered within the well in spaced relation to the wall thereof and in direct and open exposure to surrounding well fluid, a pump at the lower end of said tubing adapted to force liquid upwardly through the tubing and to maintain therein a column of liquid extending above the wall liquid level, conductor means located deep in the well at an intermediate portion of the tubing a substantial distance above said pump and electrically connecting the tubing and the wall of the well, means for supplying to a length of the tubing extending continuously upward from said conductor means to substantially the top of the tubing electric current of sufficient amperage to heat said length of the tubing and well fluid contacting said length, to a temperature sufficient to melt congealed bodies, said conductor means serving to determine the vertical extent of the tubing heated to said melting temperature and to confine the current to a length spaced substantially above said pump.

4. In a well clearing apparatus of the character described, the combination comprising a production flow tubing lowered within the well in spaced relation to the wall thereof and in direct and open exposure to surrounding well fluid, conductor means located deep in the well at an intermediate portion of the tubing and electrically connecting the tubing and the wall of the well, said conductor means being adapted to be positioned at different depths in the well and being connected to a tubing coupling, means for supplying to a length of the tubing extending continuously upward from said conductor means to substantially the top of the tubing electric current of sufficient amperage to heat said length of the tubing to a temperature sufficient to melt congealed bodies in fluid contacting said heated length, said conductor means serving to determine the vertical extent of the tubing heated to said melting temperature and to confine the current to a length spaced substantially above the lower end of the tubing.

5. In a well clearing apparatus of the character described, the combination comprising a production flow tubing lowered within the well in spaced relation to the wall thereof and in direct and open exposure to surrounding well fluid, conductor means deep in the well at an intermediate portion of the tubing electrically connecting the tubing and the wall of the well, insulators positioned on said tubing above said conductor means and applied to and containing tubing couplings, means for supplying to a length of the tubing extending continuously upward from said conductor means to substantially the top of the tubing electric current of sufficient amperage to heat said length of the tubing to a temperature sufficient to melt congealed bodies in fluid contacting said heated length, said conductor means serving to determine the vertical extent of the tubing heated to said melting temperature.

IRIS C. LOOMAN.